United States Patent Office.

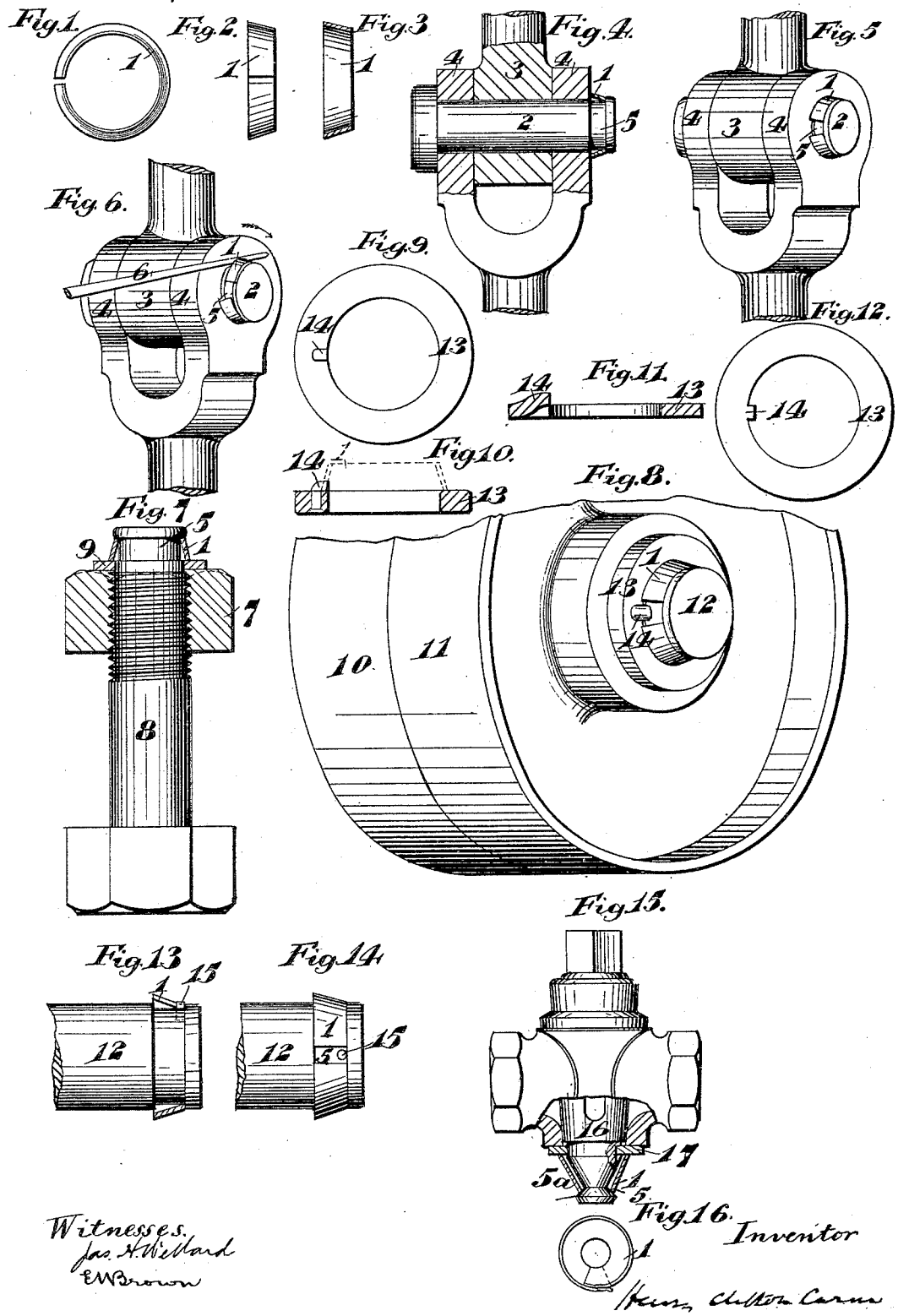

HENRY CLIFTON CARVER, OF MANCHESTER, ASSIGNOR TO EDMUND DRINKWATER CARVER, OF WIMBLEDON, ENGLAND.

FASTENING DEVICE FOR WHEELS, &c.

SPECIFICATION forming part of Letters Patent No. 491,469, dated February 7, 1893.

Application filed October 16, 1891. Serial No. 408,916. (No model.) Patented in England February 27, 1891, No. 3,606; in France August 27, 1891, No. 215,761; in Belgium August 27, 1891, No. 96,180, and in Germany September 30, 1891, No. 65,405.

*To all whom it may concern:*

Be it known that I, HENRY CLIFTON CARVER, a subject of the Queen of Great Britain and Ireland, residing at Manchester, in the county of Lancaster, England, have invented improvements in means for retaining wheels or other objects in place on studs, shafts, bolts, or the like, or keeping in place joint-pins, cock-plugs, or the like, (for which I have obtained in other countries the following enumerated patents: British patent, No. 3,606, dated February 27, 1891; French patent, No. 215,761, dated August 27, 1891; Belgian patent, No. 96,180, dated August 27, 1891, and German patent, No. 65,405, dated September 30, 1891,) of which the following is a specification.

According to this invention wheels and other objects are retained in place on studs, shafts, bolts or the like, and joint pins, cock plugs or the like are kept in place, by means of collars thimbles or tubes (hereinafter called collars) made of resilient metal in the form of split hollow truncated cones. The collars may, according to circumstances, be used either alone, or in combination with washers, which may sometimes be of the ordinary type, and sometimes of special construction as hereinafter described.

To enable the nature of the invention to be clearly understood reference is made to the accompanying drawings in which Figures 1, 2 and 3 are respectively an end elevation a side elevation and a cross section, showing one form of collar according to this invention. This collar is made of resilient metal so that on being expanded it will tend to contract to its original form.

Fig. 4 is a sectional view showing the collar 1 applied to retain a joint pin 2 in place within the ends 3, 4 of two rods which are connected together by the pin. A groove 5 is formed in the joint pin, the groove being by preference about as deep as the collar is thick; part of the collar rests within this groove, abutting against one side of it, and owing to the conical form of the collar, part of it projects without the groove and beyond the periphery of the joint pin so as to abut against the rod end 4. It will be seen that with the collar situated and abutting as described and shown, the joint pin is prevented from becoming displaced from the rod ends 3, 4. The diameter of the bottom of the groove is slightly larger than the smallest inside diameter of the collar, consequently the collar when in position cannot contract to its normal size, and in its effort to do so, it clasps and grips the pin at the bottom of the groove. The collar is placed in position by being pressed against the end of the joint pin 2 so as to expand the collar, and by being pushed along the pin until it contracts, by its resiliency, into the groove 5.

Fig. 5 is a perspective view of the arrangement shown in Fig. 4, the gap between the ends of the collar being in sight and being wider than that shown in Figs. 1 and 2, because, as already stated, the collar is prevented by the pin 2 from contracting to its normal size.

Fig. 6 is a similar view to Fig. 5 except that the collar is shown in process of removal by means of a pointed instrument 6, which, after having been forced into the position shown, is to be pushed around, in the direction indicated by the arrow, until the collar is thereby liberated from the pin.

Fig. 7 shows the application of the collar 1 for retaining a nut 7 in position on a bolt 8. The end of the bolt has the threads turned off as shown, and a groove 5 is formed in it to receive the collar. 9 is an ordinary washer fitting onto the turned down part of the bolt and interposed between the collar 1 and the nut 7 so that the collar abuts against it and prevents both it and the nut from being displaced endwise. Sometimes the washer 9 may be omitted; but in this case, unless the larger diameter of the collar be made relatively greater in reference to the size of the bolt than is shown in Fig. 7, the collar would find an abutment against the nut for a part of its circumference only, owing to the cutting away of the nut to form the thread within it. Such an increase in the larger diameter of the collar can be obtained, if desired, either by increasing the width of the collar, or by making the cone flatter. An inclination of about one in four with the axial line is found to be generally the most convenient angle for the cone of which the collar forms a part, but a greater or less angle than this may be adopted to suit particular cases.

Fig. 8 is a perspective view showing a fast pulley 10 and loose pulley 11 mounted side by side on a shaft 12. The loose pulley is prevented from running off the end of the shaft by the collar 1 which at one end enters a groove in the shaft, and at the other end bears against a washer 13, provided with a pin or key 14, which enters the gap between the ends of the collar, and causes the washer and collar to interlock with each other. When the loose pulley rotates upon the shaft, while the shaft is stationary, the washer and collar will also remain stationary, as, owing to their being interlocked as described, one cannot rotate without the other, and the frictional grip of the collar upon the shaft is more than sufficient to oppose the frictional force, tending to rotate the washer, set up between the pulley and the washer. In this way the whole surface of the washer in contact with the pulley is available for resisting wear.

Figs. 9 and 10 are detached views of the washer 13, Fig. 9 being a face view and Fig. 10 a cross section, the collar 1 being shown in position in Fig. 10 by dotted lines. It will be seen that in this case, the key 14 is formed by a pin riveted flush on one side into the washer. Sometimes when the washer is thin enough to admit of it, the key 14 may be formed by slitting the washer and raising a piece of it as shown in section in Fig. 11. In other cases the key 14 may be made after the manner of a feather key, as shown in Fig. 12; when this construction is adopted there is no interlocking of the washer with the collar, but a keyway to admit the key is cut in the shaft on which the washer is placed so that the washer interlocks with the shaft. Sometimes the collar may be caused to interlock with the shaft by means of a pin or key 15 secured in the shaft as shown in elevation in Figs. 13 and 14, and this arrangement may be employed either with or without a key washer according to circumstances.

Fig. 15 shows partly in elevation and partly in section, a view of a cock having a plug, 16 retained in position by the collar 1. The groove 5 in the plug which receives the collar, is formed with an inclined or conical lower side 5$^a$ as shown, for the lower edge of the collar to abut against; in this case the groove is made much deeper than the thickness of the collar. In this case also the collar does not necessarily clasp the plug at the bottom of the groove, but may do so at any part of the inclined side against which the lower edge of the collar abuts. The upper edge of the collar abuts against a washer 17 which rotates with the plug, as is customary with washers so situated. In the drawings the washer is shown with a feather key like that shown in Fig. 12 to enter a groove in the plug 16 for causing these parts to rotate together, but other known methods may be adopted for this purpose. The collar is made of such a diameter that when it is in position its resiliency causes it to constantly seek, by contraction, to get deeper into the groove; consequently, owing to the inclined form of the lower side 5$^a$ of the groove against which the collar abuts, and to the contractile action of the collar, the wear of the plug downward through the barrel of the cock, is taken up automatically as fast as it occurs, and the plug is kept steadily home to its seat. As the collars are required in arrangements such as that illustrated in Fig. 15 to have a comparatively large range of expansion and contraction it is sometimes advantageous to make them with their ends overlapping as shown in the detached end view Fig. 16 so as to either entirely prevent the occurrence of a gap between the ends of the collars (such as is shown in Figs. 5 and 8) when they are in position, or so that the gap will be smaller than it would otherwise be. The collars are also in this case made by preference with a flatter cone and wider than in the applications previously described. The arrangement of collar and groove shown in Fig. 15 may sometimes be employed for retaining nuts or bolts instead of that shown in Fig. 7.

When the uses to which the collars are put render steel a suitable material for their manufacture, it is preferred to impart the requisite resiliency to them by hardening and tempering them after they are made, as is usual in the case of steel springs. The steel collars may if desired be coated with nickel, tin or other metal by known methods so as to render them comparatively non-corrosive. When however the collars are for uses to which steel is unsuited, they may be made of phosphor bronze or other suitable metal, rendered resilient by cold rolling or other known methods.

For retaining in position toothed wheels running loose on fixed studs, either the collars alone as in Fig. 4, or the collars and key washers combined as in Fig. 8 may be employed, according to circumstances. Thus if a spur wheel runs horizontally on a vertical stud the grooved end of which is uppermost a collar alone will usually be sufficient, but if the grooved end be lowermost, so that the wheel would be constantly tending to run off the end of the stud, a key washer is employed in combination with the collar, in order to provide ample surface for the face of the wheel boss to run upon.

It will be obvious that the arrangements of collars, and of collars and key washers combined as herein described with reference to the drawings, are applicable to many other uses, similar to those which have been specified by way of example.

It will be seen that in each of the arrangements described, the end thrust of the collar against the outer end wall of the groove in which its smaller end is held, falls within the periphery of the portion of the pin forming the said end wall of the groove.

It is to be understood that I reserve to myself the right to vary the forms, proportions, dimensions, materials and other details as may be found necessary or desirable in carrying out my invention.

In the following claiming clauses, the pin, bolt, shaft, plug or other object upon or around which a wheel or other object is to be retained in place, is for the sake of brevity called a pin.

What I claim is:—

1. For retaining a wheel or other object in position, a pin having an annular groove formed therein and arranged to extend through said wheel or object, and a spring split collar of hollow truncated conical form, having its smaller end arranged within said groove so as to encircle said pin and its larger end to bear against the wheel or object to be retained in place whereby the end thrust of said collar on the outer end wall of said groove will fall within the outer periphery of said end wall substantially as herein described.

2. For retaining a wheel or other object in position, a pin having an annular groove formed therein and arranged to extend through said wheel or object, a spring split collar of truncated conical form having its smaller end encircling the grooved part of said pin and its larger end extending toward said wheel or other object, and a washer interposed between said collar and wheel or other object substantially as herein described for the purpose specified.

3. For retaining a wheel or other object in position, a pin having an annular groove formed therein and arranged to extend through said wheel or other object, a spring split collar of truncated conical form having its smaller end encircling the grooved part of said pin and its larger end extending toward said wheel or object, and a washer arranged between said collar and wheel or other object and fixed in relation to said collar substantially as herein described for the purpose specified.

4. For retaining a wheel or other object in position, a pin having an annular conical surface formed thereon and arranged to extend through said wheel or other object, and a spring split collar of truncated conical form having its smaller end bearing against the conical surface on said pin and its larger end directed toward said wheel or other object substantially as herein described for the purpose specified.

5. For retaining a wheel or other object in position, a pin arranged to extend through said wheel or other object and having an annular conical surface formed thereon, a spring split collar of truncated conical form, having its smaller end bearing against said conical surface, and a washer arranged between said wheel or other object and the larger end of said collar substantially as herein described for the purpose specified.

In testimony whereof I have signed my name to this specification in the presence of two subscribing witnesses.

HENRY CLIFTON CARVER.

Witnesses:
JAMES HERBERT WELLARD,
ERNEST WILLIAM BROWN,
   *Both of 3 Cross Street, Manchester.*